Figure 1:
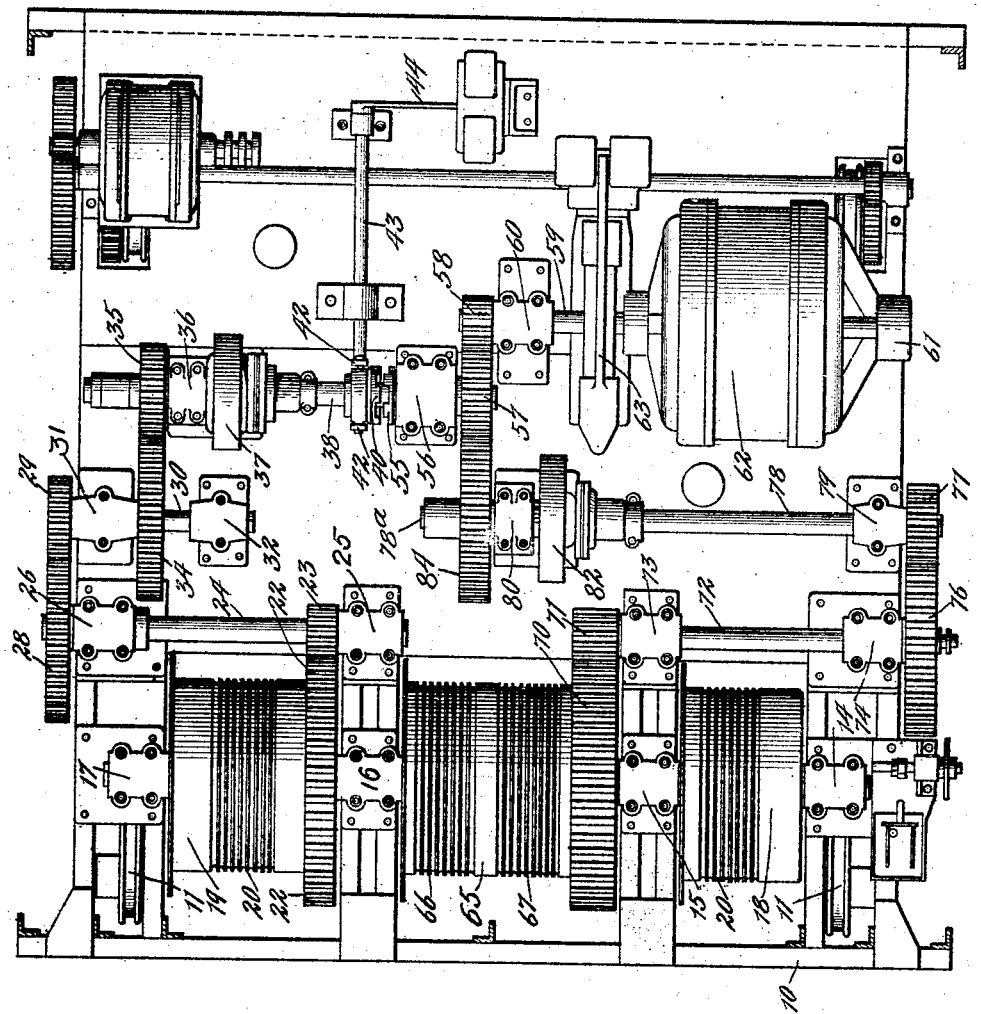

No. 875,367. PATENTED DEC. 31, 1907.
A. H. McDOUGALL.
CLUTCH ARRANGEMENT FOR TRAVELING CRANES.
APPLICATION FILED MAY 23, 1907.

2 SHEETS—SHEET 1.

Witnesses:

Inventor:
Andrew H. McDougall
By Cheever & Cox
Attys

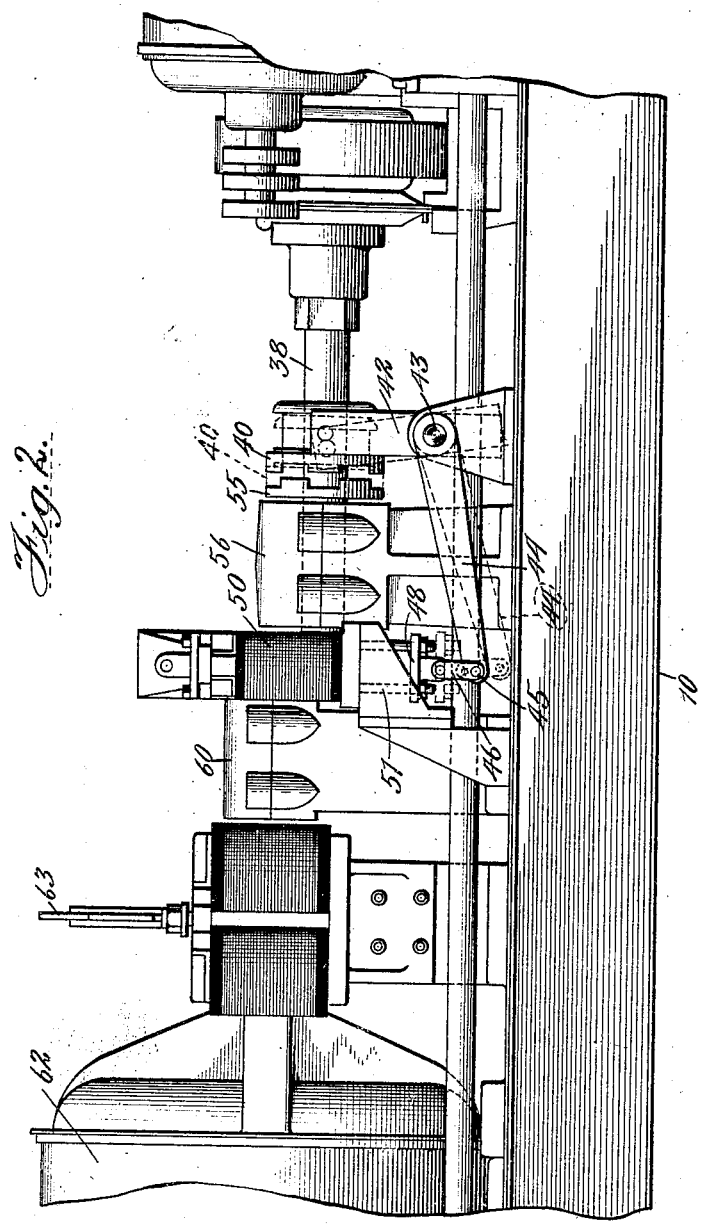

UNITED STATES PATENT OFFICE.

ANDREW H. McDOUGALL, OF HARVEY, ILLINOIS, ASSIGNOR TO WHITING FOUNDRY EQUIPMENT COMPANY, OF HARVEY, ILLINOIS, A CORPORATION OF ILLINOIS.

CLUTCH ARRANGEMENT FOR TRAVELING CRANES.

No. 875,367.  Specification of Letters Patent.  Patented Dec. 31, 1907.

Application filed May 23, 1907. Serial No. 375,373.

*To all whom it may concern:*

Be it known that I, ANDREW H. McDOUGALL, a citizen of the United States, residing at Harvey, in the county of Cook and State of Illinois, have invented a certain new and useful Improvement in Clutch Arrangements for Traveling Cranes, of which the following is a specification.

My invention relates to traveling cranes and particularly to a novel arrangement of a clutch and electro magnet for operating the same in connection with the lifting and releasing mechanism carried by the crane trolley.

The object of the invention is to provide an improved arrangement of the parts of such a device so that it is possible to use an alternating current magnet to operate a clutch to control the lifting mechanism carried by the trolley with reference to the releasing mechanism.

My invention consists in a novel form of mechanism for this purpose, in very neat and compact form and not liable to get out of order.

It further consists in details of construction which will be hereafter more fully described and claimed as the specification proceeds.

Figure 1 is a plan view of a crane trolley having the device of my invention applied thereto. Fig. 2 is a side elevation of the device of Fig. 1 looking at it from the right hand side of said figure.

Numeral 10 indicates the frame of a crane trolley mounted on wheels 11 running on a track (not shown) in the ordinary manner. Journaled in suitable bearings 14, 15, 16 and 17 is a shaft (not visible) carrying on its ends two releasing or dumping drums 18 and 19, said drums being rigidly secured to the shaft. On these drums are grooves 20 in which ropes designed for the purpose of dumping the load are adapted to be secured and travel. Mounted on this shaft which carries the drums 18 and 19 is a gear wheel 22 rigidly secured to drum 19. This gear meshes with a pinion 23 on a shaft 24 mounted in bearings 25 and 26. On the end of this shaft 24 is a gear 28 meshing with a pinion 29 rigidly secured to a shaft 30, journaled in bearings 31 and 32. Rigidly secured to this shaft 30 is a gear 34 meshing with a pinion 35 rigidly secured to an invisible shaft journaled in a bearing 36 the opposite end of said shaft being connected to one side of a mechanical clutch 37 one form of which is shown in a patent to William Voss, 681,489, for Automatic Brake, issued August 27, 1901. The opposite side of this brake is connected to a shaft 38 on which is slidably mounted a jawed clutch member 40. This clutch member is so mounted upon the shaft 38 that it has to rotate with the shaft but may be moved longitudinally on the shaft. This may be done by means of a spline connection or other suitable means. This clutch member 40 is as best shown in Fig. 2 mounted upon a vertical arm 42 of a bell crank pivoted by means of shaft 43; the other arm 44 of the bell crank being secured by a pin 45 and a link 46 to an armature 48 controlled by an alternating current magnet 50. When the current is turned into this magnet 50 through suitable electric connections of the well known type it lifts this armature and with it the attached rods 51 and thereby tilts the bell crank 42—44 from dotted line to full line position Fig. 2 with the result that the clutch member 40 is moved to the right of Fig. 2 or towards the top of Fig. 1 with the result that the jawed member 40 is thrown out of engagement with the member 55 to be hereafter described. When the electric current is cut off from the magnet the weight of the armature and core within the magnet causes the bell crank to move in the opposite direction and throw the clutch member 40 into engagement with the opposite member 55. This clutch member 55 is rigidly secured upon a short shaft journaled in a bearing 56 and on the opposite end of this short shaft is a gear 57 meshing with a pinion 58 on a shaft 59 mounted in bearings 60 and 61. On this shaft 59 is a motor 62 adapted to rotate said shaft. Between the bearing 60 and the motor is a suitable electric brake 63, one variety being shown in U. S. patent to F. A. Rundle, 766,117, July 26, 1904.

Loosely journaled upon the shaft to which the drums 18 and 19 are secured and between the bearings 15 and 16 is a drum 65 carrying two sets of rope grooves 66 and 67 in which ropes are adapted to be mounted. The ropes on this drum are used for closing the grasping mechanism upon the load and for lifting the load as will be hereafter described. Rigidly secured to this drum 65 is a gear wheel 70 meshing with a pinion 71 on a shaft 72 mounted on bearings 73 and 74. On this shaft 72 is a gear 76 meshing with a pinion 77 on a shaft 78 mounted in a bearing 79. This shaft 78 is connected to a mechanical brake 82 like the brake 37 heretofore described. The opposite side of this brake is connected to a short shaft 78ª mounted in a bearing 80. On this shaft 78ª is also a gear 84 meshing with the gear 57 heretofore described. From the foregoing it will readily be seen that when the motor 62 is operated and the clutch member 40 is in engagement with the member 55 said motor communicates power to all three drums 18, 20 and 65 and that when the clutch member 40 is thrown out of engagement with clutch member 55 only the drum 65 will be operated. The result of this construction is that the operator first starts the machine with the clutch out of engagement and rotates the drum 65 until the locking is effected. He then throws in the clutch 40 which causes all of the drums to rotate simultaneously with the result that the load is held in locked position and lifted at the same time. The lifting of the load is protected by the various brakes 37, 63 and 82 in the manner well known in the art. When the load reaches the position where it is desired to dump the same the operator throws out the clutch 40 from 55 and rotates the motor 62 in reverse direction with the result that brake 37 holds drums 18 and 19 and load thereon stationary while drum 65 is lowering with the result that the weight of the load releases the locking mechanism which holds it in the manner well known in the art.

By the use of this arrangement a small alternating current magnet may be used, thereby saving space on the crane trolley as well as quantity of electric current. By the use of the jawed clutch a small alternating current magnet may be used in place of a large direct current magnet heretofore necessary with a cone clutch.

What I claim as new and desire to secure by Letters Patent, is:

1. In mechanism of the class described in combination with a crane trolley frame, and a motor thereon; a lifting drum operated by said motor, another drum also capable of being operated by said motor, a clutch adapted to connect said drum to the motor and a bell crank lever mechanism having one arm connected to said clutch, and the other end connected to an alternating current magnet for the purposes set forth.

2. In mechanism of the class described in combination with a crane trolley frame, and a motor thereon: a lifting drum operated by said motor, another drum also capable of being operated by said motor, a jawed clutch adapted to connect said drum to the motor and a bell crank lever mechanism having one arm connected to said clutch, and the other arm connected to an alternating current magnet for the purposes set forth.

3. In combination with the frame of a traveling crane, a shaft carrying two releasing drums, a lifting drum mounted upon the same shaft between said releasing drums, a gear rigid with the releasing drums meshing with a pinion 71, rigidly connected to a gear 76 meshing with a pinion 77 connected to a mechanical brake 82, a connection between the opposite side of said mechanical brake and a gear 84 meshing with a gear 57, meshing with a pinion 58, on a shaft 59 connected through an electric brake 63 to a motor 62, a shaft connected to gear 57 carrying a clutch 55 another shaft 38 opposite said last shaft, carrying a clutch member 40 adapted to mesh with the clutch 55, an alternating current magnet, a bell crank having one arm connected to the armature of the alternating current magnet and the other arm connected to said clutch 40, a mechanical brake 37 on the shaft 38, a pinion 35 on said shaft on the opposite side of said mechanical brake meshing with a gear 34 rigid with a pinion 29, another gear 28 meshing with pinion 29 rigid with the pinion 23, and a gear 22 meshing with the pinion 23 rigidly connected to the lifting drum, all of the parts being arranged and located substantially as shown and described for the purposes set forth.

In witness whereof, I have hereunto subscribed my name in the presence of two witnesses.

ANDREW H. McDOUGALL.

Witnesses:
DWIGHT B. CHEEVER,
HOWARD M. COX.